(12) United States Patent
Hikmet et al.

(10) Patent No.: US 11,584,071 B2
(45) Date of Patent: Feb. 21, 2023

(54) PRINTER HEAD FOR 3D PRINTING

(71) Applicant: SIGNIFY HOLDING B.V., Eindhoven (NL)

(72) Inventors: Rifat Ata Mustafa Hikmet, Eindhoven (NL); Uwe Chittka, Herzogenrath (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 405 days.

(21) Appl. No.: 16/625,654

(22) PCT Filed: Jun. 19, 2018

(86) PCT No.: PCT/EP2018/066202
§ 371 (c)(1),
(2) Date: Dec. 20, 2019

(87) PCT Pub. No.: WO2018/234279
PCT Pub. Date: Dec. 27, 2018

(65) Prior Publication Data
US 2021/0154912 A1    May 27, 2021

(30) Foreign Application Priority Data

Jun. 23, 2017 (EP) .................................... 17177584

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29K 2101/12* (2013.01);
(Continued)

(58) Field of Classification Search
CPC ..... B29C 64/118; B29C 64/209; B33Y 10/00; B33Y 30/00
See application file for complete search history.

(56) References Cited

U.S. PATENT DOCUMENTS 3,587,281 A * 6/1971 Lemelson ............. B21C 23/085
425/465
4,906,171 A * 3/1990 Miller ................... B29C 48/302
264/285
(Continued)

FOREIGN PATENT DOCUMENTS

CN      105034381 A    11/2015
CN      105946236 A     9/2016
(Continued)

*Primary Examiner* — Manley L Cummins, IV

(57) ABSTRACT

A printer head (100) for a 3D-printing apparatus, comprising a nozzle (110) arranged to extrude a printing material along a principal axis (A) of the nozzle. The nozzle comprises an opening (120) having a first area (130) for allowing a flow of printing material there through, and an element (140) arranged centrally with respect to the opening in a plane perpendicular to the principal axis of the nozzle. The element has a cross-sectional second area (150) parallel to the first area, wherein the second area, in a projection on the first area in a direction along the principal axis, is defined by the first area, such that the nozzle, during operation of the printer head, allows a flow of printing material through the opening and around the element.

12 Claims, 3 Drawing Sheets

(51) Int. Cl.
*B33Y 10/00* (2015.01)
*B33Y 30/00* (2015.01)
*B33Y 70/00* (2020.01)
*B29K 101/12* (2006.01)

(52) U.S. Cl.
CPC .............. *B33Y 10/00* (2014.12); *B33Y 30/00* (2014.12); *B33Y 70/00* (2014.12)

(56) References Cited

U.S. PATENT DOCUMENTS

| | | | | |
|---|---|---|---|---|
| 5,121,329 | A * | 6/1992 | Crump | .................... B29C 64/40 228/180.5 |
| 6,106,275 | A * | 8/2000 | Huff | ...................... B29C 45/076 425/569 |
| 2010/0327479 | A1 * | 12/2010 | Zinniel | ................. B29C 64/106 425/114 |
| 2015/0174824 | A1 * | 6/2015 | Gifford | ................. B29C 64/182 425/183 |
| 2016/0121535 | A1 | 5/2016 | Li et al. | |
| 2016/0136885 | A1 | 5/2016 | Nielsen-Cole et al. | |
| 2016/0151833 | A1 | 6/2016 | Tsao | |
| 2017/0246803 | A1 * | 8/2017 | Johnson | .................. B29C 64/20 |
| 2017/0261141 | A1 * | 9/2017 | Liu | ....................... F16L 37/107 |
| 2017/0297250 | A1 * | 10/2017 | Tyler | ..................... B29C 48/304 |
| 2018/0015666 | A1 * | 1/2018 | Honda | .................. B29C 64/205 |
| 2018/0272623 | A1 * | 9/2018 | Ho | .......................... B29C 48/06 |
| 2019/0375150 | A1 * | 12/2019 | Achten | ................. B29C 64/118 |

FOREIGN PATENT DOCUMENTS

| | | | | |
|---|---|---|---|---|
| CN | 108501360 | * | 9/2018 | ........... B29C 64/118 |
| CN | 104875387 | B | 4/2019 | |
| EP | 3168029 | A1 | 5/2017 | |

* cited by examiner

PRINTER HEAD FOR 3D PRINTING

CROSS-REFERENCE TO PRIOR APPLICATIONS

This application is the U.S. National Phase application under 35 U.S.C. § 371 of International Application No. PCT/EP2018/066202, filed on Jun. 19, 2018, which claims the benefit of European Patent Application No. 17177584.4, filed on Jun. 23, 2017. These applications are hereby incorporated by reference herein.

FIELD OF THE INVENTION

The present invention generally relates to the field of 3D printing. More specifically, the present invention relates to a printer head for a 3D printing apparatus, and a method for controlling such a printer head.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

By using a 3D printing apparatus, the article or object may be built in three dimensions in a number of printing steps that are usually controlled by a computer model. For example, a sliced 3D model of the object may be provided in which each slice is recreated by the 3D printing apparatus in a discrete printing step. The 3D printing apparatus may extrude successive layers of an extrudable material from a dispenser, and the layers may be cured or otherwise hardened after extrusion (deposition), e.g. using a laser to induce the curing process. An example of such a 3D printing apparatus is disclosed in US 2010/0327479 A1.

The most widely used additive manufacturing technology is the process known as Fused Deposition Modeling (FDM). It will be appreciated that other terms for FDM are "fused filament fabrication" (FFF) or "filament 3D printing" (FDP), which are considered to be equivalent to FDM. FDM is an additive manufacturing technology commonly used for modeling, prototyping, and production applications. FDM works on an "additive" principle by laying down material in layers: a plastic filament or metal wire may be unwound from a coil and be deposited to produce an object. Possibly, e.g. for thermoplastics, the filament may be melted and extruded before being deposited. In general, FDM printers use a thermoplastic filament, which is heated to its melting point and then extruded, layer by layer (or filament after filament) to create a three-dimensional object.

EP-3168029 discloses an extrusion tool for extruding a material. The extrusion tool comprises an inlet for receiving a flow of a material, and an outlet to allow an output of a stream of the material. The extrusion tool further comprises a hollow tool body with an inlet end to allow the material to enter the hollow tool body, and an outlet end to allow the material to flow out of the hollow tool body. The hollow tool body also has a needle located at least partially within the hollow tool body, and extending to the outlet of the extrusion tool. A plurality of arms mechanically couples the needle to the hollow tool body.

FDM is a rapid prototyping technology, meaning that FDM printers are relatively fast, cost-efficient and can be used for printing relatively complicated objects. The FDM technique is also being further developed in the production of LED luminaires and lighting solutions.

However, printers of this kind may suffer from the drawback of manufacturing objects which often show imperfections as a result of the method of deposition. For example, these imperfections may include ridges and/or stepped structures, also referred to as "ribbed" structures, as a result of successive deposition of individual filaments onto a previously deposited filament layer. In other words, during the extrusion of the material the material may flow sideways, resulting in rounded edges. It will be appreciated that ridges are not only detrimental to the structural integrity (creating many initiators for cracks and delamination) and overall part tolerances of the printed object, they may also be aesthetically unpleasing. To avoid this, methods for smoothing the surfaces have been suggested, e.g. by means of solvent vapors, paintings and/or coatings. However, a significant drawback of these methods is that they require one or more extra processing steps.

Hence, alternative solutions are of interest, which are able to efficiently and conveniently eliminate or reduce the occurrence of ridges and/or staircase structures of 3D-printed objects, such that the objects produced may become more stable, more easily integrated and/or more aesthetically pleasing.

SUMMARY OF THE INVENTION

It is an object of the present invention to mitigate the above problems and to provide a printer head for creating objects by 3D printing, wherein the objects so produced have an improved surface texture. This may consequently lead to improved visual properties of the objects compared to objects produced by 3D printing according to the prior art.

This and other objects are achieved by providing a printer head and a 3D printer having the features in the independent claims. Preferred embodiments are defined in the dependent claims.

Hence, according to a first aspect of the present invention, there is provided a printer head for a 3D-printing apparatus. The printer head comprises a nozzle arranged to extrude a printing material along a principal axis of the nozzle. The nozzle comprises an opening which is perpendicular to the principal axis and which allows a flow of printing material therethrough. Furthermore, the nozzle comprises an element arranged downstream of the opening relative to a direction of the flow of printing material and arranged at a position along the principal axis, wherein the element has an ellipsoid shape or a spherical shape. Moreover, the opening has a first area and the element has a cross-sectional second area parallel to the first area, wherein the second area, in a projection on the first area in a direction along the principal axis, is defined by the first area, such that the nozzle, during operation of the printer head, allows a flow of printing material along the principal axis, through the opening and around the element.

Thus, the present invention is based on the idea of providing a printer head for a 3D-printing apparatus, wherein the nozzle is configured to deposit a printing material. During this deposition, the printing material is arranged to flow through the first area of the opening of the nozzle and around the element arranged downstream of the opening. As the element, in a cross-section thereof, has a second area which is defined (i.e. being smaller) than the first area seen in the direction of the principal axis, a central portion of the flow of printing material from the opening of the nozzle is hindered or blocked by the element arranged downstream of the opening, and the flow of printing material from the opening is hereby configured to flow around the element. Consequently, a hollow tube of the printing material is formed, which is deposited on the underlying material, e.g. a build platform or a previously deposited layer. It will be appreciated that the hollow tube is eventually configured to collapse after deposition, i.e. the hollow tube becoming relatively flat.

The present invention is advantageous in that the rounding or "bulging" of the edges of the deposited printing material may be decreased. This is accomplished by the printer head of the present invention, wherein the element of the nozzle is configured to define the geometry of the printing material flowing from the nozzle during operation of the printer head in a more precise manner compared to arrangements in the prior art. More specifically, as the element is positioned within the flow of printing material during printer head operation, the bulging profile of the layer of deposited printing material may be decreased after the printing material has been deposited by the nozzle of the printer head of the present invention.

The present invention may hereby avoid any additional processing step related to a removal of ridges or bulges of the printing material occurring on a printed object. It will be appreciated that additional processing steps may comprise mechanical after-treatments of the surfaces of a 3D-printed object and/or applications of solvent vapors, paintings and/or coatings to the object surfaces, which may lead to increases in manufacturing cost and/or time. In comparison, the printer head of the present invention, on the other hand, leads to a cost- and/or time-saving operation.

The present invention is further advantageous in that ridges or bulges of the printing material of 3D-printed objects may be conveniently reduced by the printer head, such that the objects produced by the 3D-printing apparatus may become more stable, more easily integrated and/or more aesthetically pleasing.

The printer head of the 3D-printing apparatus comprises a nozzle arranged to deposit a printing material along a principal axis of the nozzle. For example, the nozzle may extend along a vertical axis, being the principal axis of the nozzle, such that the printing material may be deposited vertically downwards. By the term "printing material", it is here meant a material which can be extruded, e.g. a plastic material. Furthermore, the term "printing material" may refer to a single type of printable material, but may also refer to a plurality of different printable materials. Hence, the term "printing material" may also refer to a combination of two or more materials.

The nozzle comprises an opening which is perpendicular to the principal axis. In other words, the opening has a cross-section which is perpendicular to the principal axis, and the opening allows for a flow of printing material therethrough.

Furthermore, the nozzle comprises an element arranged downstream of the opening relative to the direction of the flow of printing material, and the element is furthermore arranged at a position along the principal axis. Moreover, the element has a cross-section in a plane perpendicular to the principal axis which defines a second area. This second area is parallel with the first area. In a projection of the second area on the first area in a direction along the principal axis, the second area is defined by the first area in a plane perpendicular to the principal axis of the nozzle. Consequently, during operation of the printer head, the nozzle allows a flow of printing material along the principal axis, through the opening and around the element. Hence, seen in the direction of the principal axis, the second area of the element is smaller and defined by the first area of the opening. Consequently, during operation of the printer head, a flow of printing material through the opening of the nozzle is at least partially obstructed by the element.

According to an embodiment of the present invention, the opening is circular. Hence, the cross-section of the opening of the nozzle is circular, leading to a circular cross-section of the printing material extruded from the nozzle during operation of the printer head.

The element that is arranged downstream of the opening relative to a direction of the flow of printing material has an ellipsoid shape or a spherical shape. This is advantageous in that the round shape of the (outer) surface of the element may allow for a convenient flow of printed material around the element, which printed material subsequently may be deposited upon the build platform or one or more previously deposited layers.

It will be appreciated that an ellipsoid shape or a spherical shape of the element may achieve a relatively low pressure drop and/or a minimum disturbance of the laminar flow of printing material during operation of the printer head. Furthermore, by providing an ellipsoid shape of the element, a relatively stable flow of printing material may be achieved.

According to an embodiment of the present invention, the element is inclined with respect to the intended direction of movement of the printer head. In other words, the element may be inclined around an axis perpendicular to the principal axis of the nozzle and perpendicular to the intended direction of movement of the printer head. The present embodiment is advantageous in that an arrangement of the ellipsoid at an angle with respect to the intended direction of movement of the printer head may prevent delamination. According to an embodiment of the present invention, the angle α of inclination of the element with respect to the intended direction of movement of the printer head is $0°<\alpha<60°$.

According to an embodiment of the present invention, the center of the element is arranged offset by a distance to the principal axis of the nozzle in the opposite direction of the intended direction of movement of the printer head. The present embodiment is advantageous in that the flow of printing material around the element may be improved.

According to an embodiment of the present invention, the printer head further comprises a fastening arrangement for holding the element. The present embodiment is advantageous in that the fastening arrangement may conveniently hold the element in the flow of printing material from the nozzle during operation of the printer head.

According to an embodiment of the present invention, the fastening arrangement comprises at least one connecting element arranged between the opening and the element, wherein at least a portion of the at least one connecting element, arranged to come into contact with the flow of printing material along the principal axis during operation of the printer head, comprises a rounded surface. Hence, the element is connected to the opening via one or more connecting elements, and the connecting element(s) has one or more portions or areas facing the flow of printing material along the principal axis during operation of the printer head. The present embodiment is advantageous in that the printing material may flow smoothly around the connecting elements, such that the intervention of the connecting elements on the flow of printing material is minimal during operation of the printer head.

According to an embodiment of the present invention, the printer head further comprises a plate arranged around the opening. The plate, which may be arranged in a plane perpendicular to the principal axis of the nozzle (i.e. parallel to the intended direction of movement of the printer head), is configured to come into contact with printing material deposited by the printer head during operation. The present embodiment is advantageous in that the plate may hereby conveniently flatten at least a top portion of the printing material after its deposition (extrusion) during operation of the printer head. Consequently, the plate of the printer head may even further decrease the bulging effect of the deposited printing material.

According to an embodiment of the present invention, the plate comprises a surface in a vicinity of the opening. The surface is configured to come into contact with printing material deposited by the printer head during operation, wherein a first portion of the surface is inclined with respect to an axis perpendicular to the intended direction of movement of the printer head and perpendicular to the principal axis of the nozzle. The present embodiment is advantageous in that this specific "roof" shape of the plate may efficiently flatten the side surfaces of the deposited printing material.

According to an embodiment of the present invention, a second portion of the surface of the plate in an opposite direction of the intended direction of movement of the printer head is parallel with respect to the axis perpendicular to the intended direction of movement of the printer head and perpendicular to the principal axis of the nozzle. In other words, the second portion of the surface of the plate comprises a straight edge. The present embodiment is advantageous in that it may even further flatten the side surfaces of the deposited printing material.

According to an embodiment of the present invention, the inclination of the first portion of the surface of the plate continually decreases in a direction towards the second portion of the surface of the plate.

According to an embodiment of the present invention, there is provided a 3D-printing apparatus comprising a printer head according to any one of the preceding embodiments.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
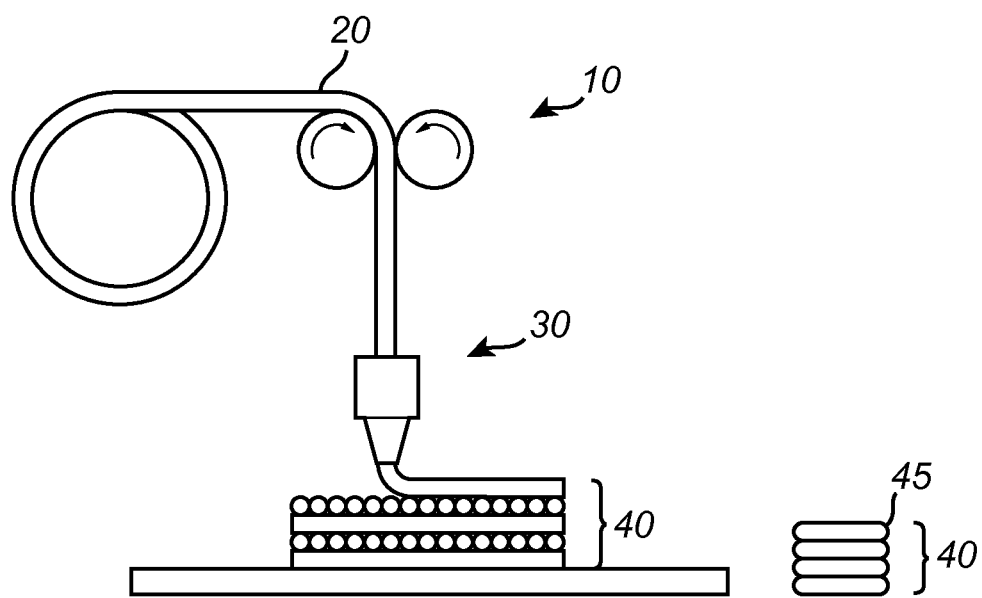
FIG. 1 is a schematic view of a printer head 10 of a 3D-printing apparatus according to the prior art.

FIG. 1 is a schematic view of a printer head 10 of a 3D-printing apparatus according to the prior art. The printer head 10 uses a printing material in form of a thermoplastic filament 20 which is fed to nozzle 30 for deposition. The filament 20 is heated to a temperature at which it may flow readily, and the nozzle 30 may deposit (extrude) the printing material in layers 40 to create a 3D object. 3D-printing apparatuses of this kind are relatively fast, cost-efficient and can be used for printing relatively complicated 3D objects.

During operation of the 3D-printing apparatus, the relatively hot printing material is pressed through the nozzle 30 of the printer head 10 and solidifies on a build-plate or on a previously solidified layer of printing material. Due to the laminar flow of the melted printing material, the layers 40 often comprise bulged or rounded edges 45, as schematically shown in FIG. 1. Consequently, the bulged layers 40 lead to a relatively rough surface finish of the 3D-objects produced. Furthermore, the bulged layers 40 may be detrimental to the structural integrity and overall part tolerances of the 3D-printed object, as they may create initiators for cracks and delamination.

Figure 2:
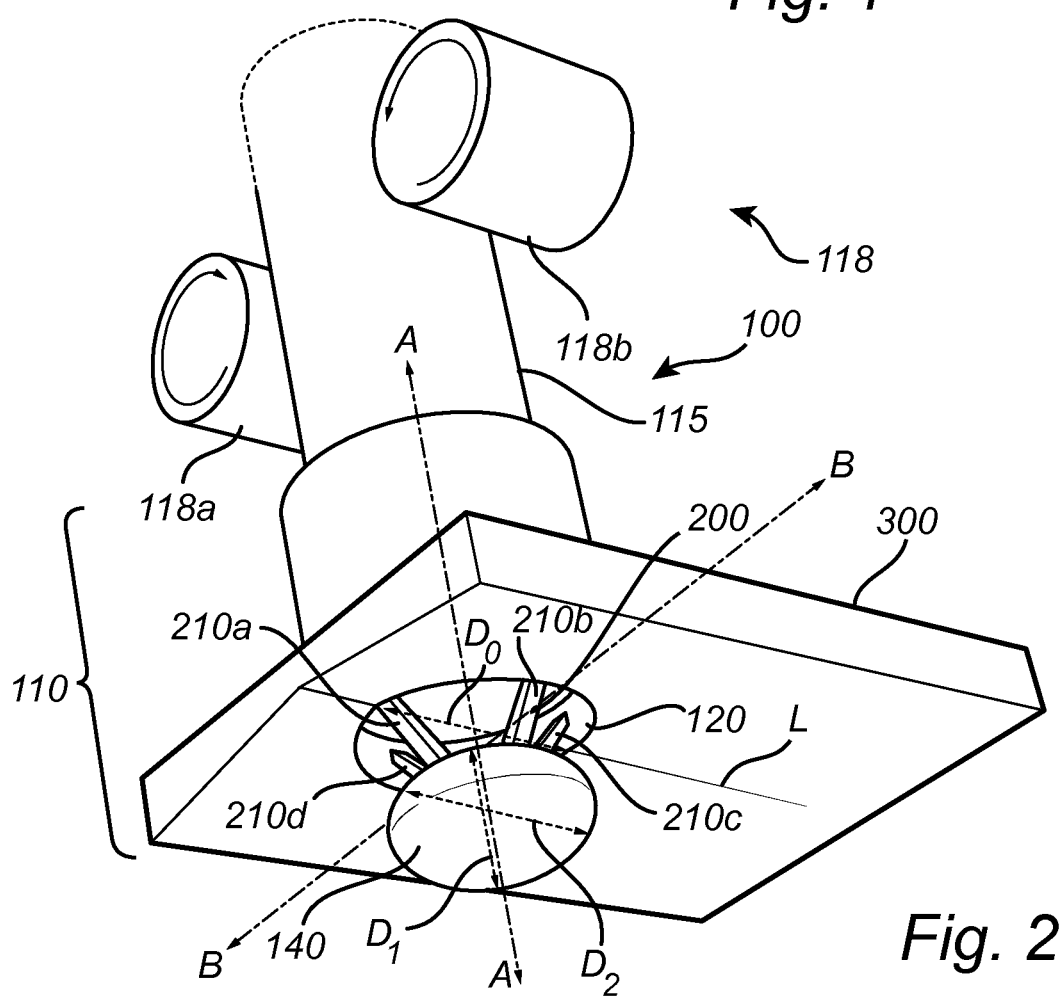
FIG. 2 is a schematic view of a printer head for a 3D-printing apparatus according to an exemplifying embodiment of the present invention.

FIG. 2 is schematic view of a printer head 100 for a 3D-printing apparatus according to an embodiment of the present invention, wherein the purpose of the printer head 100 is to overcome the mentioned deficiencies of 3D-printing according to the prior art.

The printer head 100 comprises a nozzle 110 arranged to melt and to extrude a printing material 115. The printing material 115 may be fed to the nozzle 110 by a feeding arrangement 118 of the printer head 100. Here, the feeding arrangement 118 is exemplified as two rollers 118a-b configured to abut the printing material 115 and to rotate in opposite directions, such that the printing material 115 is fed to the nozzle 110. It will be appreciated that the printing material 115, which may be a plastic, may have the form of a filament.

Printing materials 115 that may be specifically suitable as 3D-printable materials may be selected from the group consisting of metals, glasses, thermoplastic polymers, silicones, etc. Especially, the printing material 115 may comprise a (thermoplastic) polymer selected from the group consisting of ABS (acrylonitrile butadiene styrene), nylon (or polyamide), acetate (or cellulose), PLA (polylactic acid), terephthalate (such as PET polyethylene terephthalate), acrylic (polymethylacrylate, Perspex, polymethylmethacrylate, PMMA), polypropylene (or polypropene), polystyrene (PS), PE (such as expanded-high impact-polythene (or polyethene), low density PE (LDPE), high density PE (HDPE)), PVC (polyvinyl chloride), polychloroethene, etc. Optionally, the printing material 115 may be selected from the group consisting of urea formaldehyde, polyester resin, epoxy resin, melamine formaldehyde, polycarbonate (PC), rubber, etc. Optionally, the printing material 115 may comprise a material selected from the group consisting of a polysulfone, a polyether sulfone, a polyphenyl sulfone, an imide (such as a polyetherimide), etc. It will be appreciated that the printing material may be light-transmissive, more specifically optically transparent. PPMA, PC, amorphous PET, PS and co-polyesters of two or more thereof may be suitable polymers. Furthermore, blends of two or more of these may also be applied. Hence, polymeric materials may be applied that are at least partially transmissive for visible light. For instance, the polymeric material may be transparent to light.

It will be appreciated that the term "polymeric material" may in embodiments refer to a blend of different polymers, but may in embodiments also refer to essentially a single polymer type with different polymer chain lengths. Hence, the terms "polymeric material" or "polymer" may refer to a single type of polymers, but may also refer to a plurality of different polymers. In general, the (polymeric) materials have a glass transition temperature $T_g$ and/or a melting temperature $T_m$. The printing material 115 may be heated by the printer head 100 before it leaves the nozzle 110 to a temperature of at least the glass transition temperature, and in general at least the melting temperature. Hence, the operation of the printer head 100 may comprise heating the printing material 115 above its glass transition temperature, and if it is a semi-crystalline polymer, also above its melting temperature. In yet another embodiment, the printing material 115 may comprise a (thermoplastic) polymer having a melting point $T_m$, and the operation of the printer head 100 may comprise heating the printing material 115 to be deposited to a temperature of at least the melting point.

The nozzle 110 extends (elongates) along a principal axis A, which in the example of FIG. 2 is parallel with the vertical direction. The nozzle 110 may be arranged to deposit the printing material 115 along this principal axis A of the nozzle 110. The nozzle 110 comprises an opening 120 for allowing a flow of printing material therethrough, wherein the opening 120 is arranged (lies) in a plane which is perpendicular to the principal axis A.

An element 140 is arranged downstream of the opening 120 relative to a direction of the flow of printing material 115 and arranged at a position along the principal axis A. Here, the element 140 has an ellipsoid shape, wherein the diameter $D_1$ of the element 140 along the principal axis A is smaller than the diameter $D_2$ of the element 140 along an axis perpendicular to the principal axis A. The ratio of the smaller diameter $D_1$ of the element 140 to the larger diameter $D_2$, i.e. $D_1/D_2$, may for example be 0.5-1. Furthermore, the ratio of the diameter $D_1$ of the element 140 to the diameter $D_o$ of the opening 120, i.e. $D_1/D_o$, may for example be 0.5-1. Moreover, the diameter $D_o$ of the opening 120 of the nozzle 110 may be 0.5-5 mm.

The printer head 100 further comprises a fastening arrangement 200 for holding the element 140. Here, the fastening arrangement 200 comprises a plurality of connecting elements 210a-d arranged between the opening 120 and the element 140 of the nozzle 110. Here, the connecting elements 210a-d are exemplified as bars, but it should be noted that the connecting elements 210a-d may have substantially any shape. Furthermore, it will be appreciated that the number of connecting elements 210a-d is arbitrary. The connecting elements 210a-d comprise respective portions which are arranged to come into contact with the flow of printing material along the principal axis A during operation of the printer head 100. The portions comprise a rounded surface, such that the intervention of the connecting elements 210a-d on the flow of printing material is minimal during operation of the printer head 100.

The printer head 100 further comprises a plate 300 which is arranged around the opening 120 of the nozzle 110. The plate 300 is exemplified as a rectangular slab wherein the plate 300 is configured to come into contact with printing material deposited by the printer head 100 during operation. It will be appreciated that the element 140, the fastening arrangement 200 and/or the plate 300 may comprise a non-sticky, low-frictional coating to reduce the adhesion with the printing material during operation of the printer head 100. The coating may comprise polytetrafluoroethylene (PTFE, Teflon), or the like.

The plate 300 comprises a surface in a vicinity of the opening 120, wherein the surface is configured to come into contact with the printing material 115 extruded by the printer head 100 during operation. A first portion of the surface is inclined with respect to an axis B perpendicular to the intended direction of movement of the printer head 100 and perpendicular to the principal axis A of the nozzle 110. As indicated by FIG. 2, the surface comprises a "roof-shape" in a vicinity of the opening 120.

Furthermore, a second portion of the surface of the plate 300 in an opposite direction of the intended direction of movement of the printer head 100 is parallel with respect to the axis B. Hence, as the intended direction of movement of the printer head 100 is to the left in FIG. 2, the second portion of the surface of the plate 300 is provided to the right in the figure.

Moreover, the inclination of the first portion of the surface of the plate 300 continually decreases in a direction towards the second portion of the surface of the plate. In other words, the "roof-shape" of the plate continuously decreases along the line or axis L in FIG. 2. Hence, at the rightmost part in the figure, the "roof-shape" has vanished and the edge of the second portion is straight.

Figure 3:
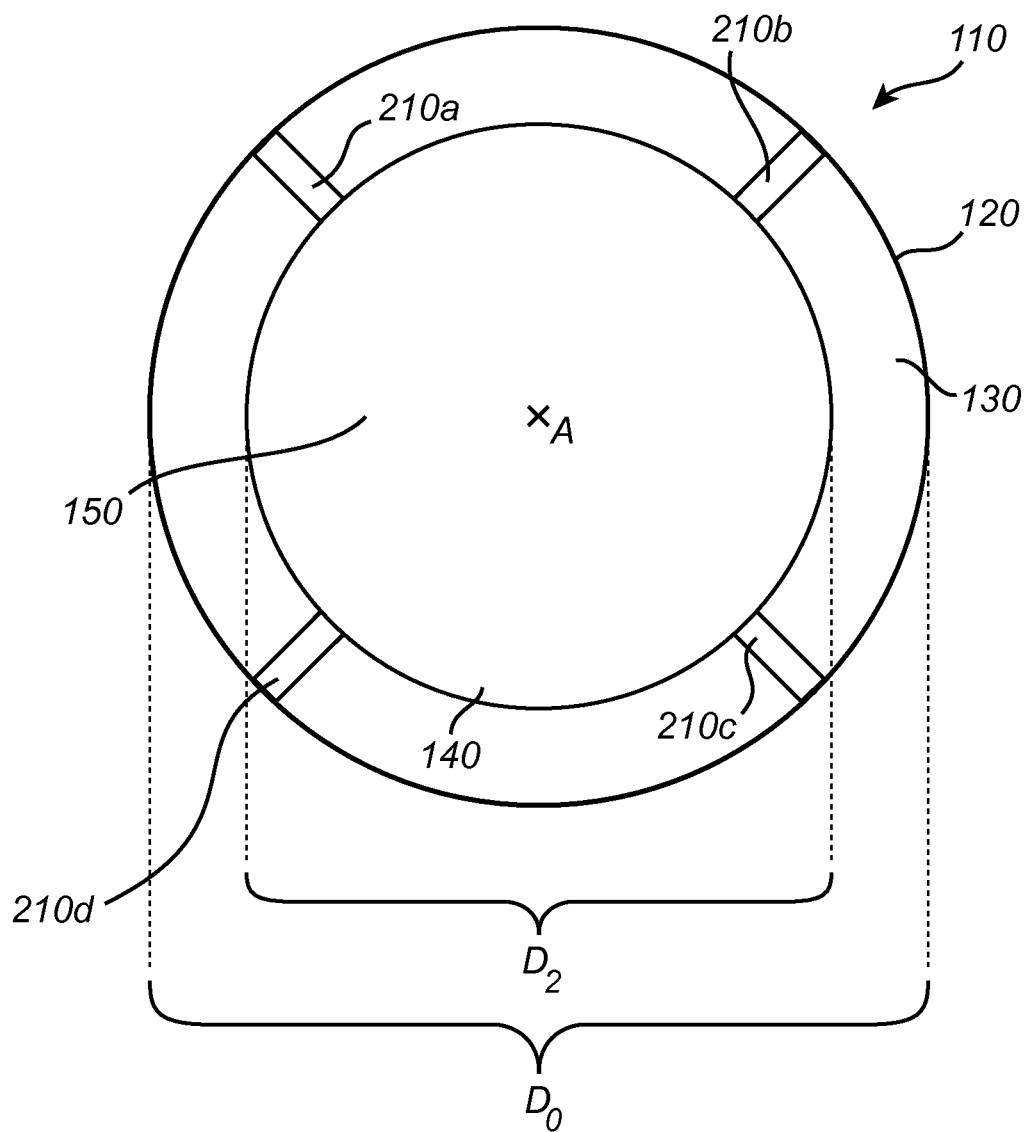
FIG. 3 is a schematic view of an element of the nozzle according to an exemplifying embodiment of the present invention.

FIG. 3 is a schematic view of the nozzle 110 of the printer head 100 according to an exemplifying embodiment of the present invention. Here, the nozzle 110 is depicted along the principal axis A, i.e. along the flow of the printing material during operation of the printer head 100. The opening 120 of the nozzle 110 has a first area 130. Here, the opening 120 is circular, but it will be appreciated that the opening 120 may have substantially any shape. The element 140 has a cross-section which is perpendicular to the principal axis A, wherein the cross-section has a second area 150 which is smaller and defined by the first area 130. In other words, in a projection on the first area 130 in a direction along the principal axis A, the second area 150 is defined by the first area 130. Consequently, during operation of the printer head 100, the relationship between the (second area 150 of the) element 140 and the (first area 130 of the) opening 120 of the nozzle allows a flow of printing material along the principal axis A, through the opening 120 and around the element 140.

The portions of the connecting elements 210a-d which are arranged to come into contact with the flow of printing material along the principal axis A during operation of the printer head 100 (i.e. the portion of the connecting elements 210a-d facing the viewer in FIG. 3) may comprise a rounded surface.

Figure 4:
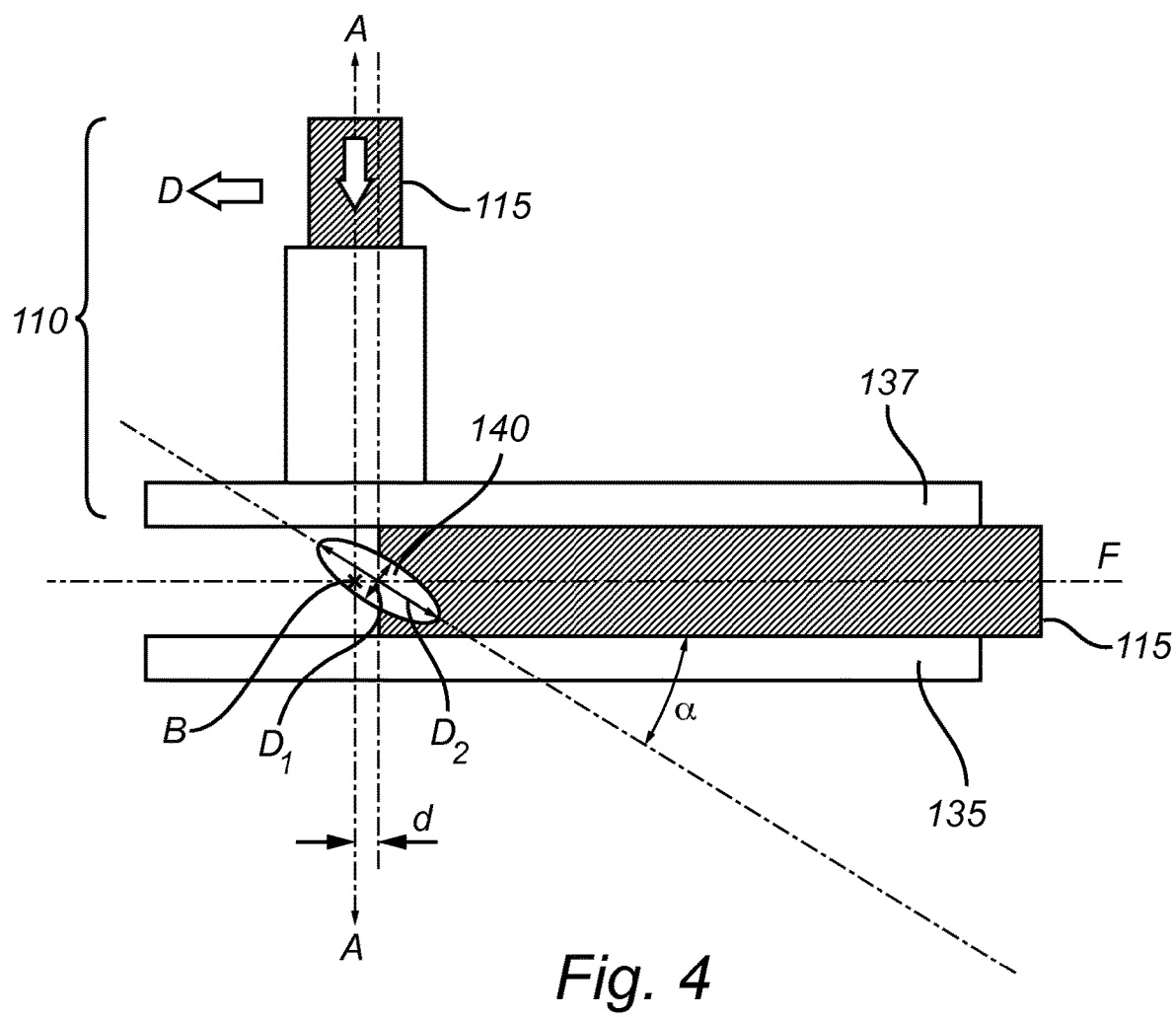
FIG. 4 is a schematic view of the operation of a printer head for a 3D-printing apparatus according to an exemplifying embodiment of the present invention.

FIG. 4 is yet another schematic view of the nozzle 110 of the printer head according to an exemplifying embodiment of the present invention. During operation of the printer head, the printing material 115 flows downwards along the principal axis A of the nozzle 110, as indicated by the vertical arrow. The printing material 115 flows through the opening of the nozzle 110 and around the element 140. Then, the printing material 115 is deposited on a build platform 135, and the plate 300 of the nozzle 110 arranged around the opening and extending in an opposite direction of the intended direction D of movement of the printer head (as indicated by the arrow) and parallel with the build platform 135 is configured to come into contact with the deposited printing material 115.

In accordance with the nozzle 110 of FIG. 2, the element 140 in FIG. 4 has an ellipsoid shape, wherein the diameter $D_1$ of the element 140 is smaller than the diameter $D_2$ of the element 140. In this embodiment, the element 140 is inclined with respect to the intended direction D of movement of the printer head. More specifically, the angle $\alpha$ of inclination of the element 140 with respect to the intended direction D of movement of the printer head may be $0° < \alpha < 60°$.

Furthermore, the center of the element 140 in FIG. 4 is arranged offset by a distance d to the principal axis A of the nozzle 110 in the opposite direction of the intended direction D of movement of the printer head. The offset d is preferably smaller than the radius (diameter $D_o/2$) of the opening of the nozzle 110. Furthermore, there is preferably no offset of the element 140 in a direction perpendicular to the principal axis A of the nozzle 110 and perpendicular to the intended direction D of movement of the printer head.

Moreover, the center of the element 140 in FIG. 4 is traversed by the axis F which is parallel to the intended direction D of movement of the printer head and centered between the plate 300 and the build platform 135. In other words, the center of the element 140 is preferably provided between the plate 300 and the build platform 135.

The person skilled in the art realizes that the present invention by no means is limited to the preferred embodiments described above. On the contrary, many modifications and variations are possible within the scope of the appended claims. For example, it will be appreciated that the figures are merely schematic views of printer heads according to embodiments of the present invention. Hence, any elements/components of the printer head such as the nozzle 110, the element 140, etc., may have different dimensions, shapes and/or sizes than those depicted and/or described. For example, the nozzle 110, the element 140, etc., may be larger or smaller than what is exemplified in the figures.

The invention claimed is:

1. A printer head for a 3D-printing apparatus, comprising a nozzle arranged to extrude a printing material along a principal axis of the nozzle, wherein the nozzle comprises
   an opening with a cross-sectional first area that is perpendicular to the principal axis, for allowing a flow of printing material through the opening, and
   an element arranged downstream of the opening relative to a direction of the flow of printing material and arranged at a position along the principal axis, the element having an ellipsoid shape, wherein the element has a cross-sectional second area that is perpendicular to the principal axis and parallel to the first area,
   wherein the cross-sectional second area of the element is smaller than the cross-sectional first area of the opening, and wherein the nozzle, during operation of the printer head, allows the flow of printing material along the principal axis, through the opening and around the element.

2. The printer head according to claim 1, wherein the opening is circular.

3. The printer head according to claim 1, wherein the element is inclined with respect to an intended direction of movement of the printer head.

4. The printer head according to claim 3, wherein an angle α of inclination of the element with respect to the intended direction of movement of the printer head is between 0° and 60°.

5. The printer head according to claim 1, wherein a center of the element is arranged offset by a distance to the principal axis of the nozzle in an opposite direction of an intended direction of movement of the printer head.

6. The printer head according to claim 1, further comprising a fastener or bar to hold the element.

7. The printer head according to claim 1, further comprising at least one connecting element arranged between the opening and the element, wherein at least a portion of the at least one connecting element, arranged to come into contact with the flow of printing material along the principal axis during operation of the printer head, comprises a rounded surface.

8. The printer head according to claim 1, further comprising a plate arranged around the opening, wherein the plate is configured to come into contact with the printing material extruded by the printer head during operation.

9. The printer head according to claim 8, wherein the plate comprises a surface, wherein the surface is configured to come into contact with the printing material extruded by the printer head during operation, and wherein a first portion of the surface is inclined with respect to an axis perpendicular to an intended direction of movement of the printer head and perpendicular to the principal axis of the nozzle.

10. The printer head according to claim 9, wherein a second portion of the surface of the plate in an opposite direction of the intended direction of movement of the printer head is parallel with respect to the axis perpendicular to the intended direction of movement of the printer head.

11. The printer head according to claim 9, wherein the inclination of the first portion of the surface of the plate continually decreases in a direction towards a second portion of the surface of the plate.

12. A 3D-printing apparatus, comprising a printer head according to claim 1.

* * * * *